United States Patent
Kortesalmi et al.

(10) Patent No.: US 6,427,073 B1
(45) Date of Patent: Jul. 30, 2002

(54) PREVENTING MISUSE OF A COPIED SUBSCRIBER IDENTITY IN A MOBILE COMMUNICATION SYSTEM

(75) Inventors: Jyrki Kortesalmi; Tapio Pelto, both of Nokia (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/254,969

(22) PCT Filed: Sep. 16, 1997

(86) PCT No.: PCT/FI97/00550

§ 371 (c)(1), (2), (4) Date: Mar. 16, 1999

(87) PCT Pub. No.: WO98/12891

PCT Pub. Date: Mar. 26, 1998

(30) Foreign Application Priority Data

Sep. 17, 1996 (FI) .................................................. 963678

(51) Int. Cl.⁷ ............................................... H04M 3/42
(52) U.S. Cl. ....................... 455/414; 455/557; 455/411; 455/558
(58) Field of Search ................................. 455/410, 414, 455/56.1, 33.1, 23, 62, 54.1, 551, 552, 422, 411, 557, 558; 379/59, 58, 62

(56) References Cited

U.S. PATENT DOCUMENTS

| | | | |
|---|---|---|---|
| 5,448,760 A | * 9/1995 | Frederick | 455/56.1 |
| 5,765,105 A | * 6/1998 | Kuriki | 455/410 |
| 5,822,691 A | * 10/1998 | Hosseini | 455/410 |
| 5,887,253 A | * 3/1999 | O'Neil et al. | 455/418 |
| 5,907,804 A | * 5/1999 | Schroderus et al. | 455/411 |
| 6,148,192 A | * 11/2000 | Ahvenainen | 455/410 |
| 6,173,172 B1 | * 1/2001 | Masuda et al. | 455/410 |
| 6,178,336 B1 | * 1/2001 | Crozat | 455/558 |
| 6,263,214 B1 | * 7/2001 | Yazaki et al. | 455/558 |

FOREIGN PATENT DOCUMENTS

| | | |
|---|---|---|
| EP | 0 711 090 | 5/1996 |
| EP | 0 714 219 | 5/1996 |
| FI | 952339 | 11/1996 |
| GB | 2 248 999 | 4/1992 |
| WO | WO 94/13115 | 6/1994 |
| WO | WO 96/36194 | 11/1996 |

OTHER PUBLICATIONS

Nov. 1994 Global System for Mobile Communications (GSM), European digital cellular telecommunications system (Phase 2); Specification of the Subscriber Identity Module—Mobile Equipment (SIM–ME) interface (GSM 11.11), p. 1–93.

Nov. Global System for Mobile Communications (GSM), European digital cellular telecommunications system (Phase 2); Subscriber Identity Modules (SIM)—Functional characteristics (GSM 02.17), p. 1–15.

* cited by examiner

Primary Examiner—Daniel Hunter
Assistant Examiner—Lana Le
(74) Attorney, Agent, or Firm—Altera Law Group, LLC (57) ABSTRACT

The invention relates to a method and an equipment of preventing the misuse of a copied subscriber identity in a mobile communication system. The use of a subscriber identity is restricted to predetermined terminals, each having an associated equipment identity in such a way that: a number of allowable equipment identities is defined for at least one subscriber identity, and a data base linking said subscriber identities and the equipment identities allowable to them is created; the terminal sends the terminal user subscriber identity and its dedicated equipment identity to the rest of the system; the rest of the system compares whether the equipment identity sent is allowable to the subscriber identity sent; as a response to the equipment identity sent being allowable to the subscriber identity sent, the use of the terminal is permitted, and otherwise the use is denied.

8 Claims, 7 Drawing Sheets

PREVENTING MISUSE OF A COPIED SUBSCRIBER IDENTITY IN A MOBILE COMMUNICATION SYSTEM

FIELD OF THE INVENTION

The invention relates to a method and system for preventing the misuse of a copied subscriber identity in a mobile communication system.

BACKGROUND OF THE INVENTION

Both the users and the network operator in all telecommunication networks have to be optimally protected against undesirable intrusions by third parties. Thus, various security procedures are called for in networks. The most important characteristics of network security are 1) protecting information relayed by the network, and 2) authentication of network users and access control. The most important protection mechanism in the foreseeable future is some kind of encryption. Authentication is a measure for ensuring that information is originating from the source indicated. It is typically based on passwords and keys. Access rights are indicated as the ability to send and/or receive via a switching channel. Also access mechanisms are based on some sort of password or key.

As data transmission to mobile subscribers takes place on a radio connection, public land mobile networks (PLMN) are especially vulnerable to misuse of their resources by unauthorized users who eavesdrop on the information exchanged on the radio path. This is because radio signals may be listened to and sent from any place without access to user or operator equipment. It is obvious that the need for improved security is more pronounced in PLMN networks than in conventional telecommunication networks.

Figure 1:
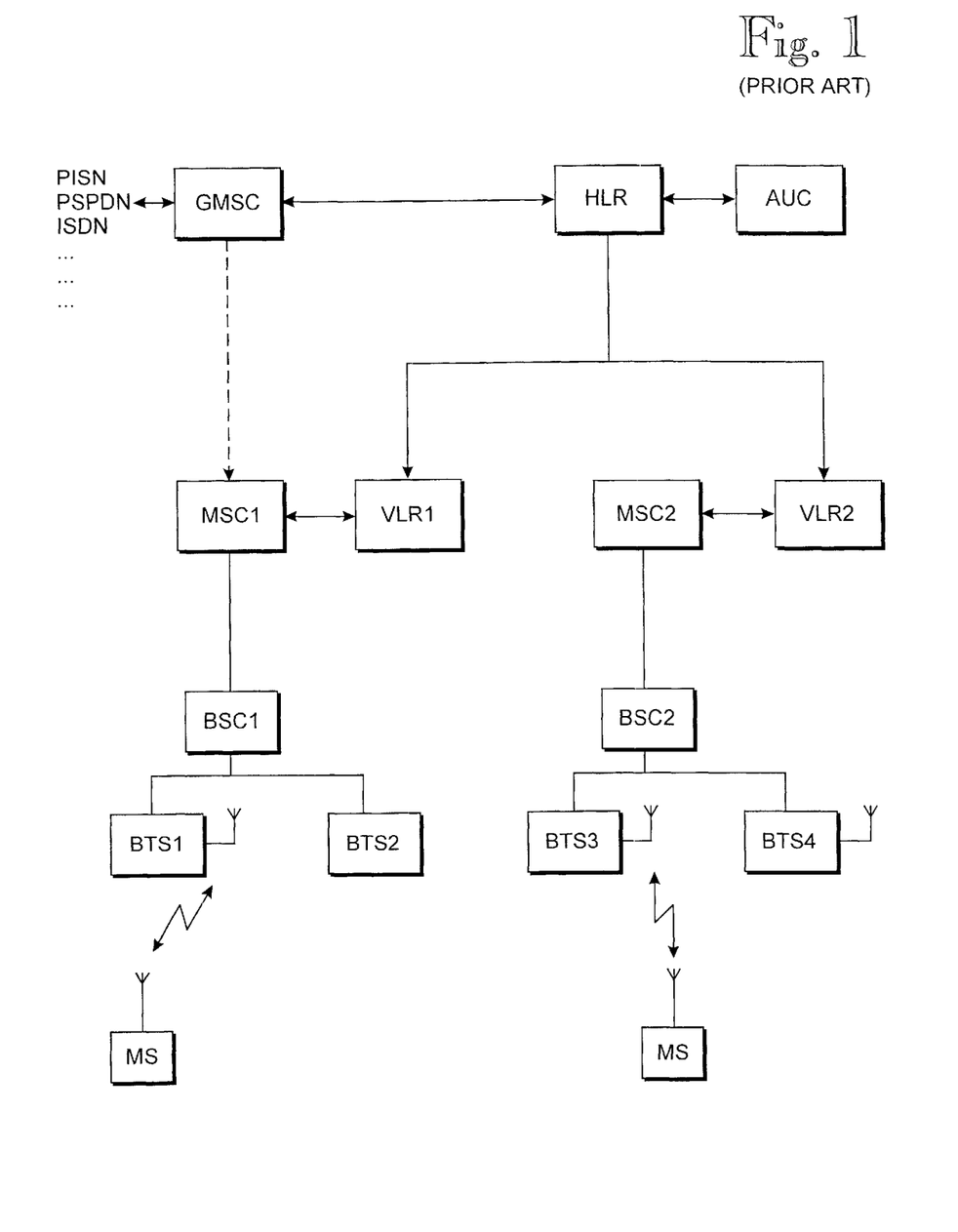
FIG. 1 shows the parts of a mobile communication network relevant to the invention.

The basic structure of the pan-European digital cellular radio system GSM (Global System for Mobile Communications) is shown in FIG. 1. The structure of the GSM network consists of two parts: a base station subsystem (BSS) and a network subsystem (NSS). The BSS and mobile stations MS communicate by means of radio connections. A base transceiver station (BTS) serves each cell in the base station subsystem BSS. A group of base stations BTS is linked to a base station controller (BSC) serving to control the radio frequencies and channels used by the base station BTS. The base station controllers BSC are linked to a mobile switching centre (MSC). A mobile switching centre serves to switch calls involving at least one mobile station MS. Some mobile switching centres MSC are linked to other telecommunication networks, such as a public integrated services network (PISN), and include switching procedures for dealing with calls to and from these networks. Such mobile switching centres are called gateway MSCs (GMSC).

Two types of data bases are involved in the routing of calls. Subscriber data on all subscribers is stored in a home location register HLR permanently or semi-permanently, including information on the services the subscriber can access and the present location of the subscriber. An other type of register is a visitor location register VLR. The VLR is usually associated with one mobile switching centre MSC, but may serve several centres. The visitor location register VLR is usually integrated into the mobile switching centre MSC. Such an integrated network element is called a visited mobile switching centre (VMSC). When a MS is active (it has registered in the network and may initiate or receive a call), the majority of the subscriber data on the mobile station MS in the home location register HLR is loaded (copied) into the visitor location register VLR of the mobile switching centre MSC whose area the MS is roaming.

The GSM system incorporates an extremely secure authentication system. This is also true of derivatives of the GSM system, such as the DCS, based on what is known as the challenge and response principle. When a subscriber contract is drawn up, the subscriber is allocated a secret subscriber authentication key ($K_i$) and an international mobile subscriber identity (IMSI). $K_i$ is stored in a GSM network element serving this purpose and called the authentication centre (AUC), associated with or connected to the subscriber home location register (HLR). The authentication centre AUC also comprises an encryption algorithm called A8, and an authentication algorithm called A3, and a random number RAND generator. An encryption key $K_c$ is generated by the algorithm A8 on the basis of $K_i$ and RAND. Similarly, a signed response (SRES) is generated by the algorithm A3 on the basis of $K_i$ and RAND. These three parameters, RAND, $K_c$, and SRES form a subscriber-specific triplet, employed later in authentication and encryption.

Figure 2:
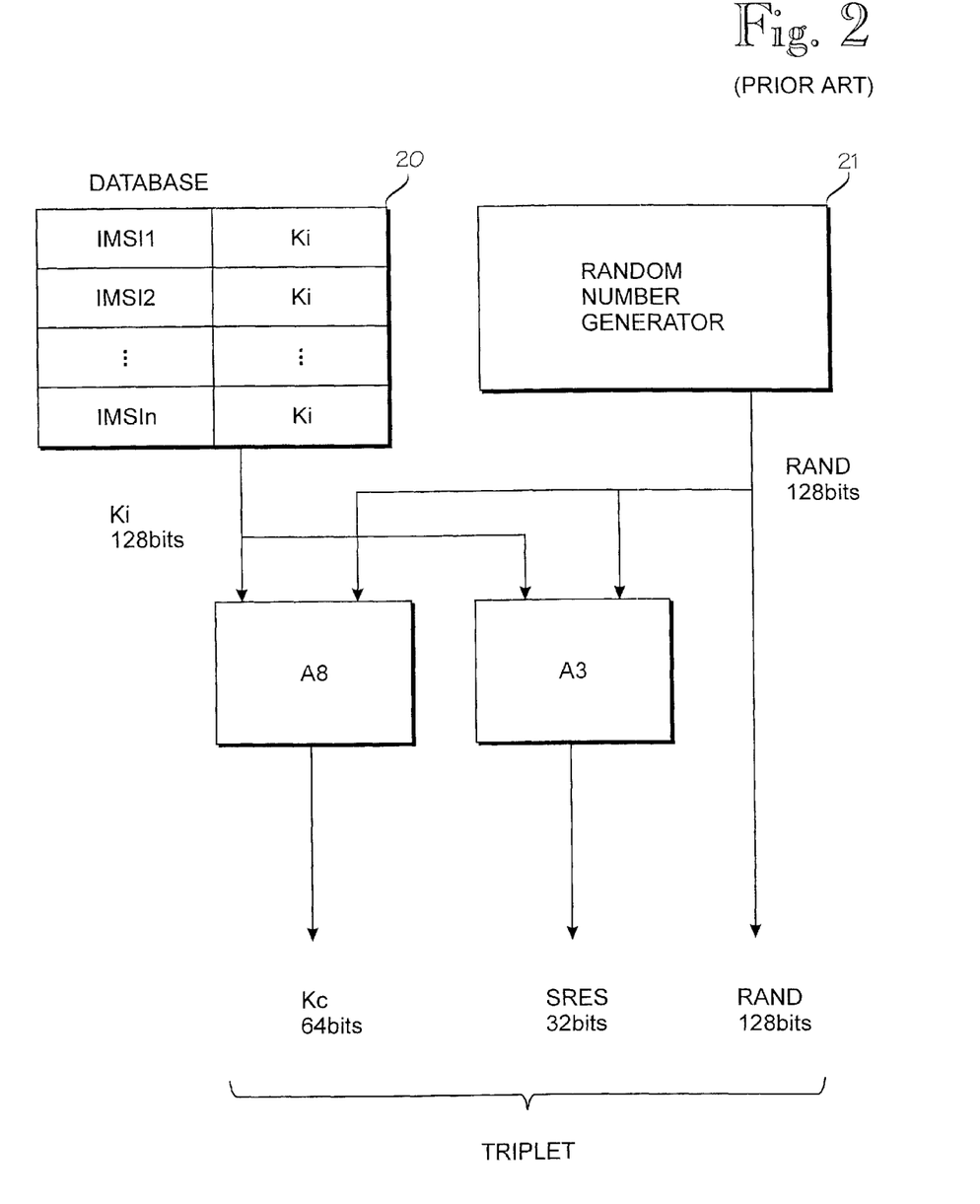
FIGS. 2 to 5 illustrate subscriber authentication in a prior art GSM system.

Referring to FIG. 2, the authentication centre AUC comprises a data base 20 for storing the authentication key $K_i$ of each GSM network subscriber. The subscriber $K_i$ may be retrieved from the data base 20 by using the mobile subscriber identity IMSI as index.

In order not to have to calculate and send the triplet always when it is needed, the AUC/HLR calculates several triplets for each subscriber in advance and delivers them on request to the visitor location register (VLR) and to the mobile switching centre (MSC), in which they are stored. The MSC/VLR has one unused triplet always at its disposal for each visiting subscriber. High-quality security presumes that the triplet is used only once for one connection, and is destroyed thereafter.

Figure 4:
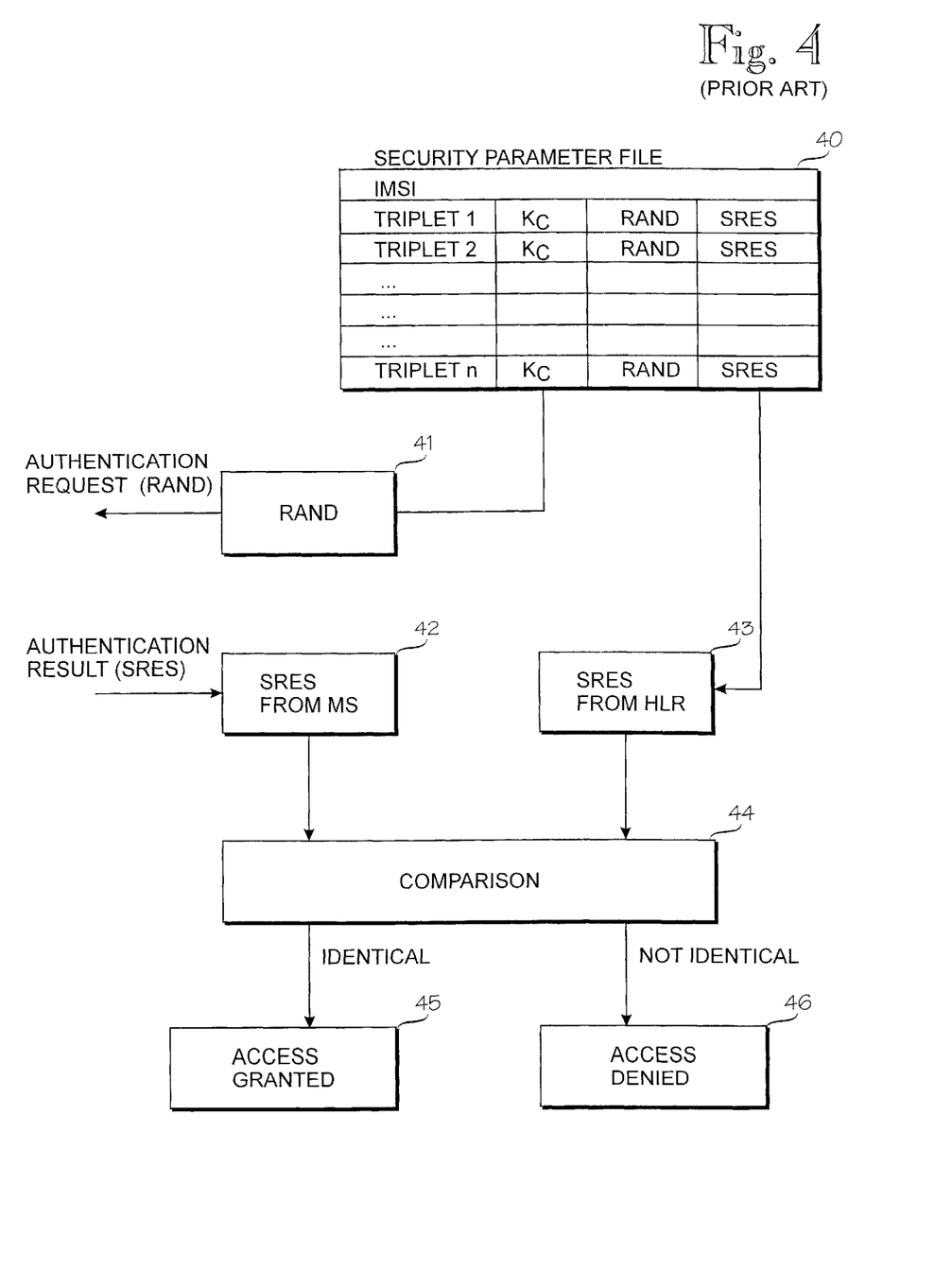

FIG. 4 shows some subscriber-specific triplets. A security parameter file 40 comprises n triplets 1 to n for each subscriber identity IMSI. This reserve in the security parameter file 40 is formed when a mobile subscriber registers in a visited centre MSC and a visitor location register VLR for the first time. It is part of the subscriber data which was loaded from the home location register HLR in connection with the INSERT SUBSCRIBER DATA message.

Figure 5:
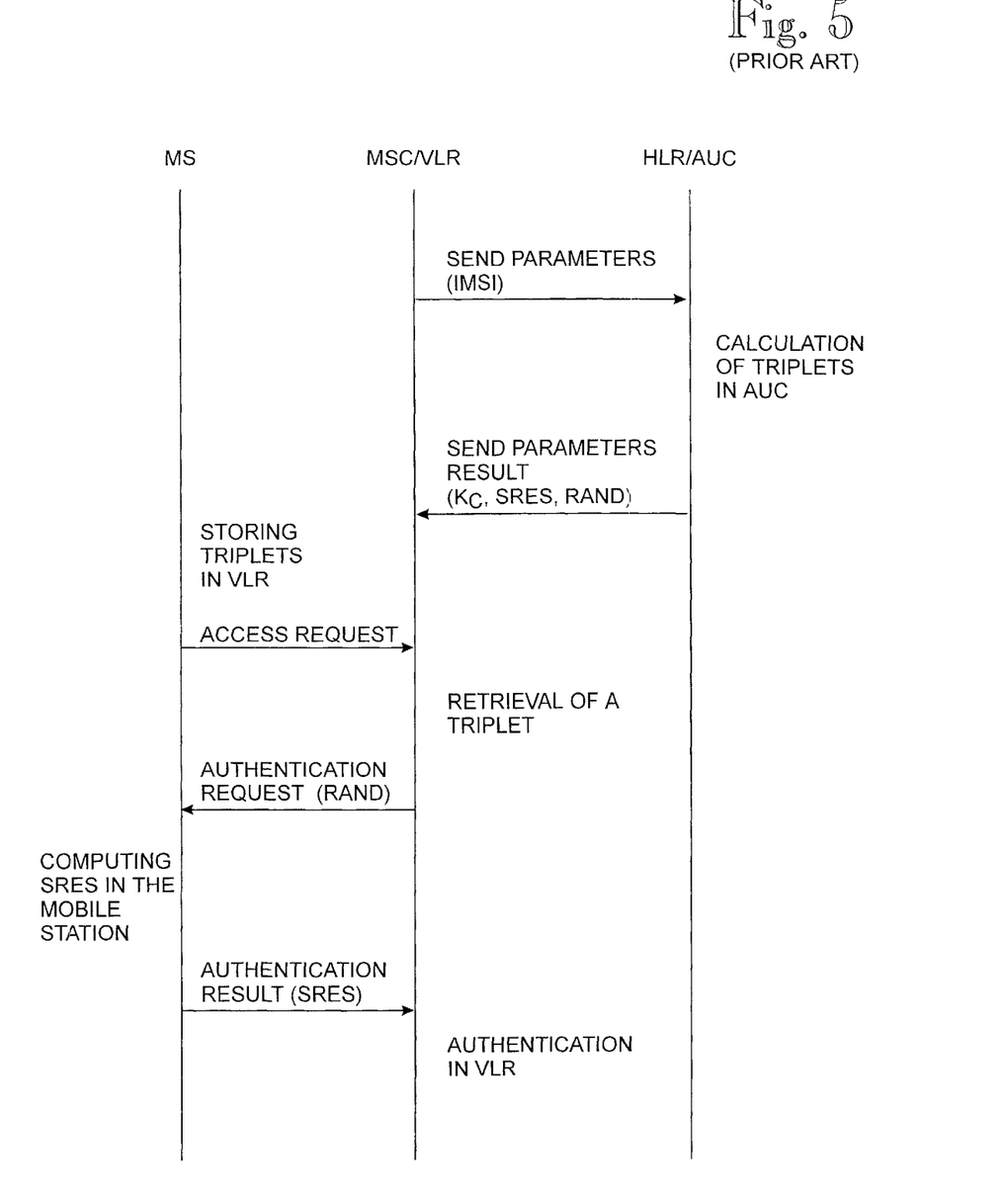

Referring to FIG. 5, when a subscriber has used all triplets at its disposal, the AUC/HLR is requested to calculate and send back a new series. This triplet completion procedure consists of two messages: SEND PARAMETERS and a response thereto called SEND PARAMETERS RESULT. The former contains the IMSI of the mobile subscriber, used to retrieve $K_i$ for calculation of the triplets, as described in connection with FIG. 2. The triplets calculated are delivered to the MSC/VLR in the SEND PARAMETERS RESULT message and stored in the visitor location register VLR.

Still referring to FIG. 4, a mobile station MS sends an access request to the MSC/VLR. The latter retrieves a triplet reserved for the mobile subscriber from the security parameter file 40 by using the IMSI as index. On one hand the MSC/VLR forwards the value of $K_c$ to the channel equipment of the base station controller BSC to be used in traffic channel coding, and on the other hand it forwards the value of RAND to the mobile station in an AUTHENTICATION REQUEST message. This is depicted by block 41 in FIG. 4. On the basis of RAND the mobile station MS calculates the other values (SRES and $K_c$) of the triplet.

Figure 3:
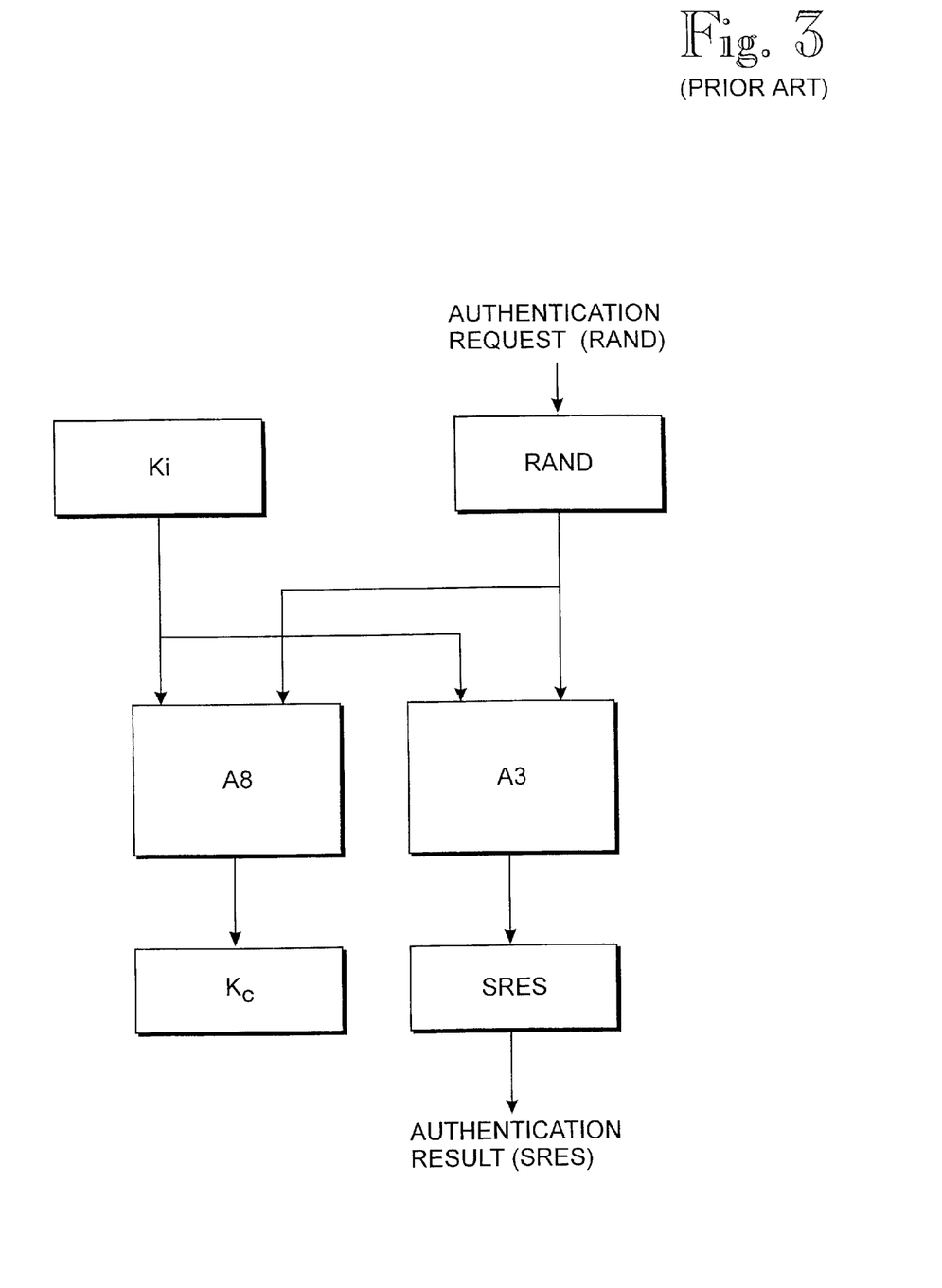

Referring now to FIG. 3, a copy of the mobile subscriber authentication key $K_i$, and the encryption algorithm A8 and the authentication algorithm A3 are stored in the mobile station. On receiving an AUTHENTICATION REQUEST message, the mobile station MS isolates RAND from the message, feeding it and the stored $K_i$ to the algorithms A3 and A8, respectively, for calculation of the signed response SRES and the encryption key $K_c$. The SRES calculated is forwarded to the MSC/VLR in the AUTHENTICATION REQUEST message in order to complete the authentication, as is shown in FIGS. 4 and 5.

Referring to FIG. 4, the MSC/VLR isolates the value of SRES from the AUTHENTICATION REQUEST message (block 42) and retrieves the stored value of SRES from the file 40 (block 43). Thereafter the MSC/VLR, for this particular connection and before any other processing, authenticates the mobile subscriber by checking that the SRES calculated in the AUC/HLR and the SRES calculated in the mobile station (block 44) are identical. If these two values are identical, access is permitted (block 45). Otherwise access is denied (block 46).

As an example, in the GSM system the authentication of a mobile subscriber is subject to a subscriber-specific authentication unit. Thus, the actual terminal is not tied up with a specific subscriber. The subscriber authentication unit, e.g. a SIM card, is a processor card or a smart card to be inserted into the mobile station and containing data required for subscriber authentication and radio traffic encryption, such as the authentication key $K_i$. In this application the subscriber authentication unit, e.g. a SIM card, refers to a processor card associated with a mobile station and generally detachable therefrom, by means of which a subscriber may use a card operated mobile station.

Thus, if a subscriber authentication unit, e.g. a SIM card (Subscriber Identity Module) is being used, the user does not necessarily have to possess a mobile station, but a subscriber authentication unit, such as a SIM card, in a way a phonecard, issued by a mobile communication system operator, is sufficient for the subscriber to make and receive calls from any mobile station of the system. The purpose of a SIM card is on one hand to place user authentication data safely protected at the disposal of the mobile station, and on the other hand to offer services to the mobile station. The services include e.g. maintenance of the identification number (input, change etc.), maintenance of the data protection key, i.e. the authentication key $K_i$, and unblocking a SIM card when it has been blocked as a result of too many inputs of a false PIN (Personal Identification Number). Unblocking a blocked SIM card is carried out e.g. by means of the PUK code (Personal Unblocking Key).

As an alternative way to implement the authentication unit, a part called plug-in-SIM has been employed to insert a SIM card into mobile phones, this part containing the electronics of the credit-card-sized SIM card and being about the size of a coin. A plug-in-SIM is inserted into the telephone such that the user cannot easily exchange it. The telephone may even comprise a fixed plug-in-SIM and additionally a card reader. If a card is inserted into the card reader, the telephone is identified according to the external card, otherwise according to the fixed plug-in-SIM card.

Thus, in the sense of this application, a mobile station (MS) consists of two parts, i.e. a mobile equipment (ME) and a subscriber identity module (SIM). The SIM card is defined in the GSM recommendation 02.17. The recommendation 11.11 specifies the issues restricted by 02.17 by defining e.g. the protocols between SIM and ME, the exact contents and lengths of SIM data fields, and issues associated with the electric and mechanical connection. An example of a data field included in a SIM card is the IMSI (International Mobile Subscriber Identity) which identifies a mobile subscriber. Similarly, in the sense of this application, the concept SIM refers generally to a subscriber authentication unit, e.g. a SIM card, a small plug-in-SIM card, a credit-card-sized SIM smart card, and a subscriber authentication unit firmly fixed to the mobile station and containing the subscriber identity and the authentication key $K_i$, unless the context implies otherwise.

In accordance with the GSM recommendations 02.17 and 11.11, three algorithms, A3, A5, and A8, are used. Algorithm A3 is used for authentication, algorithm A8 for generating an encryption key, and algorithm A5 for encryption. Algorithms A3 and A8 are installed both to the SIM card and to the authentication centre AUC. Algorithm A5 is installed both to the mobile equipment ME and to the base station BTS. Other data also stored in the authentication centre AUC include: the subscriber identity IMSI, the authentication key $K_i$, and version information on the algorithm used. The same data is also stored in the mobile subscriber's SIM card.

A problem arises in the above prior art mobile communication system when a SIM card or the data contained therein fall into the hands of a unauthorized person. This may occur when the telephone is lost or stolen, or only the SIM card is stolen therefrom. In this case the system comprises two SIM cards with identical data; the original and a copy. The use of a copied card is harmful to the mobile subscriber who owns the original card regardless of whether the misuse is extensive or slight. Extensive misuse may become extremely expensive until the subscriber notices the problem in the next telephone bill. However, if the misuse is slight, the problem may remain unnoticed for a long time. In the scope of the present application, the use of a copied SIM card refers to any technique of using fraudulently the SIM card data of another mobile subscriber.

Thus, the object of the invention is to provide a method and an equipment for implementing the method so that the above problems associated with the misuse of a SIM card or the data contained therein are solved. The objects of the invention are achieved with methods and systems characterized in what is disclosed in the independent claims. The dependent claims disclose the preferred embodiments of the invention.

The invention is based on the idea that the GSM system and its derivatives are a kind of "an ideal case of mobility" wherein only the information included in a SIM card is needed to support subscriber mobility. The majority of mobile station users would benefit from increased security at the expense of mobility. The invention is based on the idea that a mobile subscriber is given the chance to restrict the use of his/her subscriber identity to one or a few terminals. The invention is implemented e.g. so that a data element indicating if the use of said subscriber identity is restricted to certain terminals is added to one of the network registers. Should the use be restricted to certain terminals, a list of the terminals in connection with which said subscriber identity can be used is also stored in the register. Later, in connection with location updating, an inquiry is made to the register to see if the use of the subscriber identity is restricted to certain terminals. In case the use is restricted, a check is made to see if the identity of the terminal which made the location updating has been stored in the list of allowable terminals. If the identity of said terminal is not stored in the list of allowable terminals, location updating is rejected.

In the case of the GSM system and its derivatives, the register wherein the additional data according to the invention is stored is the home location register. In this case the subscriber identifier is IMSI and the terminal identifier is IMEI (International Mobile Equipment Identity). However, the identifiers IMSI and IMEI are only intended to illustrate the operation of the invention and not to restrict it to the GSM system nor the IMSI and IMEI identifiers.

The invention improves the security of a mobile communications system against misuse. The changes needed to implement the invention can be restricted to a distinctly definable small area, mainly to the software controlling the home location register. Implementing the invention does in no way disturb the operation of such network elements to which the operation according the invention has not been added.

The invention will be described in more detail below in connection with preferred embodiments with reference to the attached drawings of which.

Figure 6:
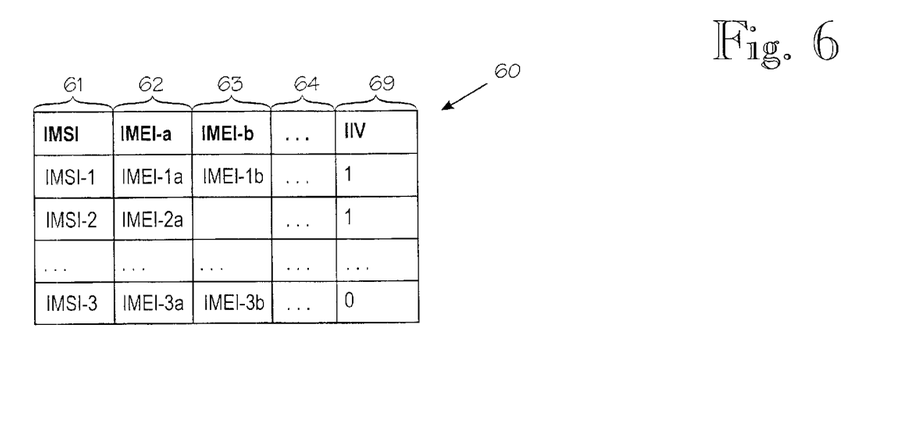
FIG. 6 shows a data base used in subscriber authentication.
Figure 7:
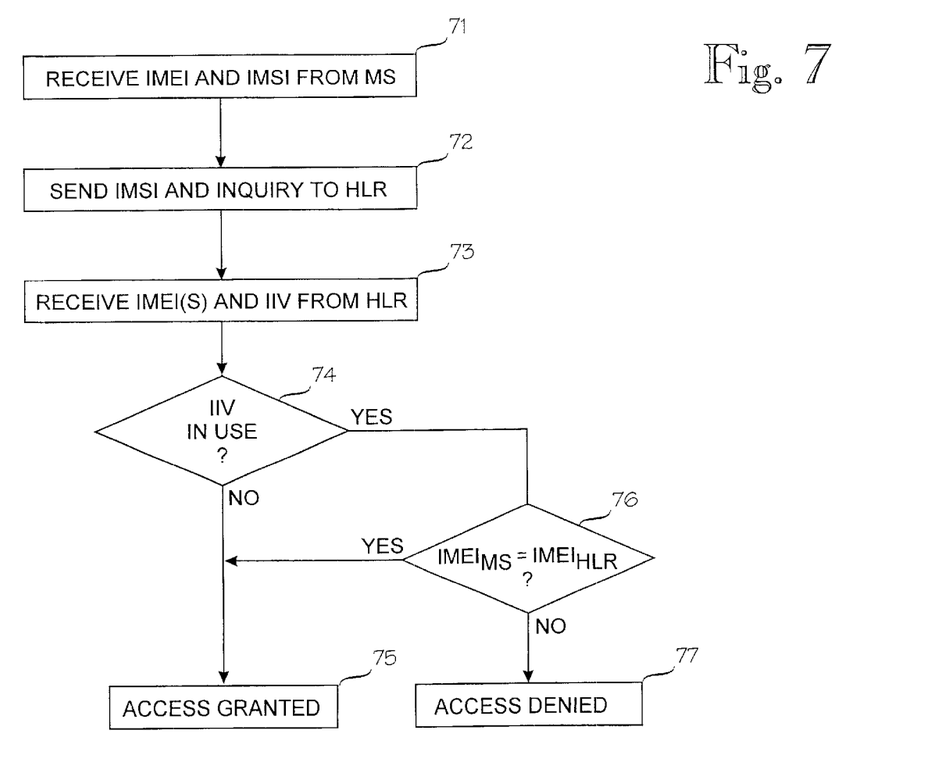
FIG. 7 is a flow diagram illustrating subscriber authentication according to the invention.
Figure 8:
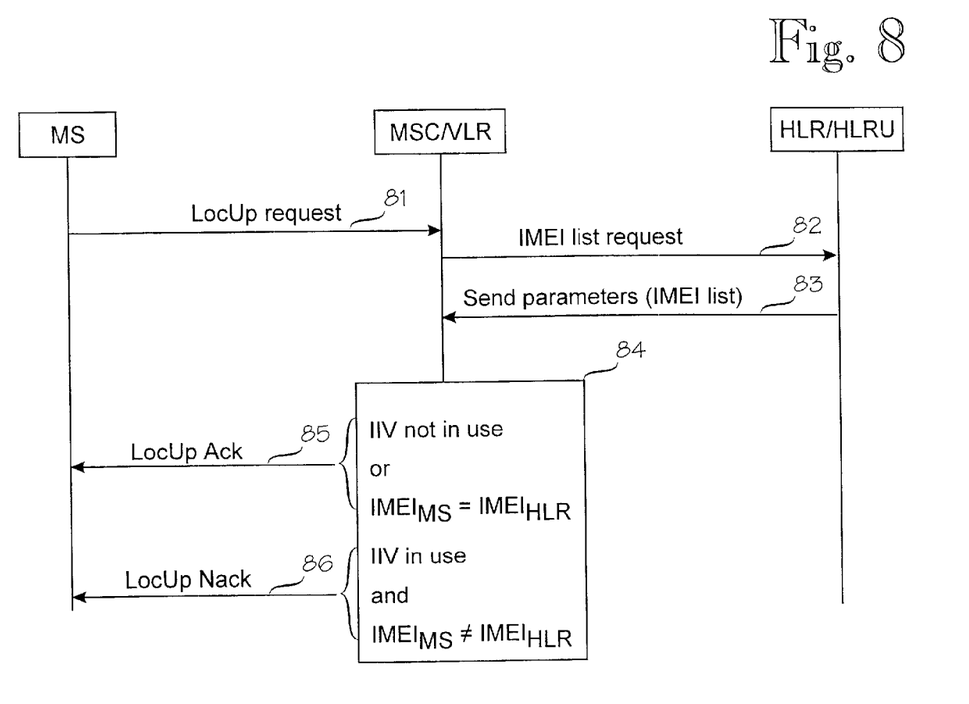
FIG. 8 is a signalling diagram illustrating subscriber authentication according to the invention.

Referring to FIGS. 6 to 8, when the operation according to the invention is taken into use, a table 60 for storing the terminal identities (IMEI, columns 62 to 64) allowable to said subscriber identity (IMSI, column 61) is created in connection with the home location register HLR. An existing table, file or data base may alternatively be expanded to include the-data of table 60. In the GSM system used as an example,.the subscriber identity is IMSI and the terminal identity is IMEI. FIG. 6 shows a situation wherein two allowable terminals whose identities are IMEI-1a and IMEI-1b, in columns 62 and 63, respectively, have been defined for subscriber identity IMSI-1. (Reference number 64 indicates that the number of allowable IMEI identities does not have to be restricted to two.) Only one allowable terminal, whose identity is IMEI-2a, has been defined for subscriber identity IMSI-2. In FIG. 6 table 60 also includes a separate data element 69 indicating whether the use of the subscriber identity (e.g. IMSI) stored in column 61 is restricted to one or some terminals whose identifiers have been stored in columns 62 to 64, respectively. Later in the present application the abbreviation IIV (IMSI-IMEI verification) is used for such a restriction.

The form of table 60 in FIG. 6 is not intended to restrict the invention. It is feasible that a separate data element 69 is not needed, the IIV information being somehow implicit. In practice, this may signify that e.g. part of the subscriber number space reserved for an operator is reserved for the subscribers for whom an IMSI-IMEI coupling according to the invention has been activated. Alternatively, the IIV information could be deduced from the fact that the subscriber identity (column 61) is actually entered into table 60. If the line corresponding to the subscriber identity is deleted from table 60, the IMSI-IMEI coupling has not been activated and the subscriber identity may be used at any terminal.

FIG. 7 illustrates subscriber authentication according to the invention. At stage 71 the centre MSC/VLR receives a subscriber identity IMSI and a mobile identity $IMEI_{MS}$ from a mobile station in connection with location up-dating. The subscript MS or HLR in the IMEI indicates whether the IMEI has been received from a mobile station MS or a home location register HLR. The notation MSC/VLR refers to the entity formed by the centre and the visitor location register. In some network architectures these elements are separate, in others they have been integrated into a single network element.

At stage 72 an inquiry is sent to the home location register HLR by using the IMSI received. At stage 73 the MSC/VLR receives from the home location register a list of IMEI codes $IMEI_{HLR}$ corresponding to the IMSI. At stage 74 a check is made to see if IIV is in use, and if not, at stage 75 the MS location updating is accepted. If IIV is in use, a check is made at stage 76 to see if the $IMEI_{MS}$ sent by the mobile station is included in the $IMEI_{HLR}$ list sent by the home location register HLR, i.e. if it corresponds to one of the $IMEI_{HLR}$ identifiers sent by the home location register HLR. If this is the case, the MS location updating is accepted at stage 75. Otherwise the location updating is rejected at stage 77 and the use of the mobile station is prohibited.

FIG. 8 is a signalling diagram illustrating subscriber authentication as regards signals between network elements. When a mobile station MS sends a location updating request 81 to the centre MSC/VLR, the latter sends to the home location register HLR a request 82 to which the home location register responds by sending a list 83 containing information on the IMEI identifiers defined for said subscriber. The stages denoted by the reference number 84 correspond to the checks made at stages 74 and 76 in FIG. 7. If IIV is not in use, the MSC/VLR sends to the mobile station an acknowledgement 85 of accepted location updating. A positive acknowledgement 85 is also sent if the $IMEI_{MS}$ sent by the mobile station corresponds to one of the $IMEI_{HLR}$ identifiers sent by the home location register HLR. A negative acknowledgement 86 is sent if IIV is in use for said subscriber and the $IMEI_{MS}$ sent by the mobile station does not correspond to any of the $IMEI_{HLR}$ identifiers sent by the home location register HLR.

On the basis of the above described example a wide variety of modifications and variations are apparent to those skilled in the art. A compromise between the traditional GSM system and the technique according to the invention could be, for example, that the subscriber identity (IMSI in the GSM system) not be coupled to the equipment identity (IMEI), but to an arbitrary identifier chosen by the subscriber and fed by the subscriber under certain circumstances, e.g. when switching on the telephone or in connection with location updating. An advantage of this alternative is that the subscriber may use any terminal. As a disadvantage may be considered the fact that an unauthorized user could find out the arbitrary identifier from the same source as the data included in the SIM card, e.g. if he/she succeeds in cracking the operator's information system. In addition, keying in an arbitrary identifier in connection with location updating would complicate normal telephone usage.

Thus the invention and its embodiments are not restricted to the above described examples, but may vary within the scope of the claims.

What is claimed is:

1. A method of preventing the use of a copied subscriber identity in a telecommunication system comprising at least one controller, several subscriber identities and several terminals, each terminal having an associated equipment identity, the method comprising:

maintaining a set of protected subscriber identities and defining a set of allowable equipment identities for each protected subscriber identity;

sending from a terminal to the controller equipment identity and subscriber identity associated with the terminal;

checking by a controller if the subscriber identity sent is a protected subscriber identity, and if it is, the controller comparing whether the equipment identity sent is allowable to the subscriber identity sent; and denying by the controller the use of the terminal if the equipment identity sent is not allowable to the subscriber identity sent.

2. The method according to claim 1 further comprising:

defining a subscriber-specific condition for at least some subscriber identities, the subscriber-specific condition indicating if the use of the subscriber identity is denied with non-allowable equipment identities; and in response to the subscriber-specific condition indicating that the use of the subscriber identity is not denied with non-allowable equipment identities, permitting the use of the terminal irrespective of the equipment identity.

3. The method according to claim 2, wherein the controller is a mobile services switching center.

4. The method according to claim 1, wherein the controller is a mobile services switching center.

5. A mobile communication system comprising:

a controller;

a register comprising information on several subscriber identities, each subscriber identity identifying a subscriber;

a plurality of terminals, each terminal having an associated equipment identity and each terminal being adapted to send its equipment identity and subscriber identity of its user to the controller;

logic for preventing the use of a copied subscriber identity, the logic comprising:

memory for linking at least one subscriber identity with a set of equipment identities allowable to the subscriber identity; and a comparator for comparing whether the equipment identity sent is allowable for the subscriber identity sent and for denying the use of the terminal unless the equipment identity sent is allowable to the subscriber identity sent.

6. The mobile communication system according to claim 5 wherein a subscriber-specific condition for at least one subscriber identity indicates if the use of the subscriber identity is denied with non-allowable equipment identities and the comparator permitting the use of the terminal irrespective of the equipment identity in response to the subscriber-specific condition indicating that the use of the subscriber identity is not denied with non-allowable equipment identities.

7. The mobile communication system according to claim 6, wherein the controller is a mobile services switching center.

8. The mobile communication system according to claim 5, wherein the controller is a mobile services switching center.

* * * * *